United States Patent [19]

Ingold

[11] Patent Number: 4,741,725
[45] Date of Patent: May 3, 1988

[54] CHAIN IN PARTICULAR FOR A CYCLE PROVIDED WITH A GEAR CHANGER

[75] Inventor: Alain F. Ingold, Paris, France

[73] Assignee: Compagnie des Transmissions Mecaniques Sedis and Sachs-Huret S.A., France

[21] Appl. No.: 11,567

[22] Filed: Feb. 6, 1987

[30] Foreign Application Priority Data

Feb. 10, 1986 [FR] France .............................. 86 01777

[51] Int. Cl.$^4$ ............................................. F16G 13/07
[52] U.S. Cl. .................................................. 474/212
[58] Field of Search ............................... 474/212-216, 474/78-82, 153, 155-160; 59/84, 85, 89; 180/72, 231

[56] References Cited

U.S. PATENT DOCUMENTS

| Re. 31,796 | 1/1985 | Nagano et al. | 474/82 |
| 1,086,146 | 2/1914 | Dodge | 474/157 |
| 2,431,513 | 11/1947 | Schwinn | 474/80 |
| 2,620,676 | 12/1952 | Raddings | 474/156 |
| 3,960,025 | 6/1976 | Fuy | 474/82 |

FOREIGN PATENT DOCUMENTS 812827 5/1937 France .
439196 12/1935 United Kingdom .

Primary Examiner—George A. Suchfield
Assistant Examiner—Thuy M. Bui
Attorney, Agent, or Firm—Sughrue, Mion, Zinn, Macpeak, and Seas

[57] ABSTRACT

This chain is improved in such manner as to improve the guiding thereof by a chain guide roller in a gear changer of a cycle. For this purpose, its outer plates (10) include along their edge (16) opposed to the side of the chain facing toward the sprockets with which the chain cooperates, a projecting portion (17) projecting toward the interior of the chain, these projecting portions (17) defining therebetween a gap (18) of reduced width in which is engageable the chain guide roller with a reduced lateral clearance. Preferably, the edge (16) is convex.

6 Claims, 2 Drawing Sheets

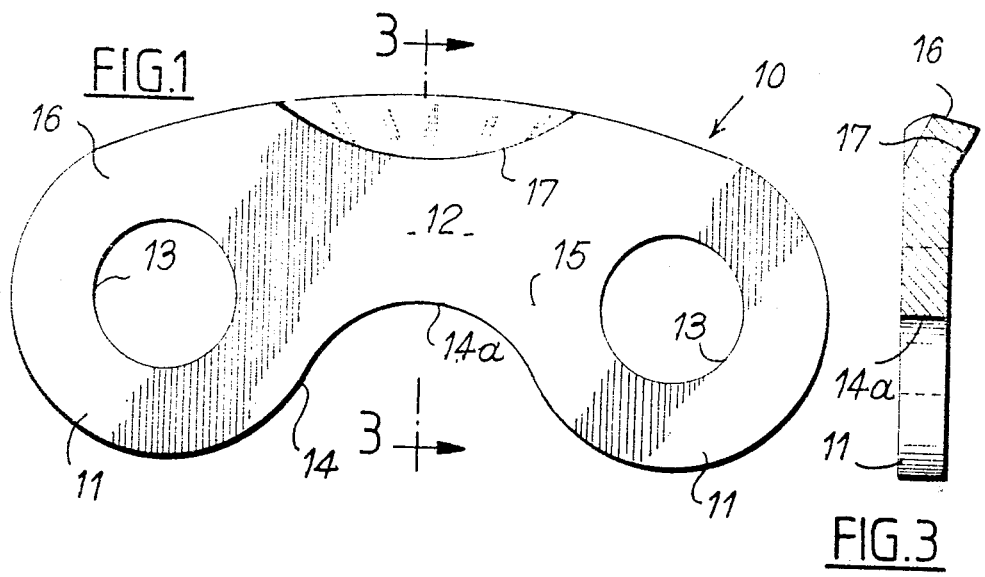
FIG.1
FIG.3
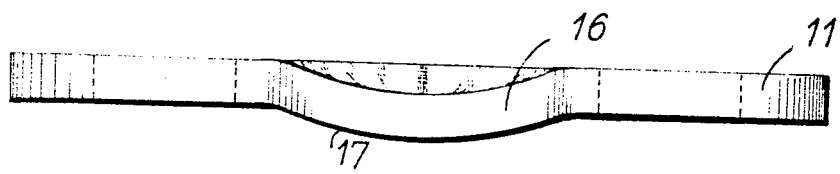
FIG.2
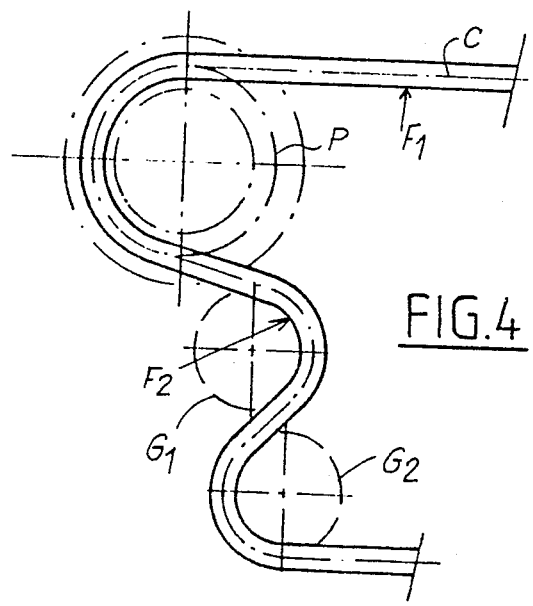
FIG.4

CHAIN IN PARTICULAR FOR A CYCLE PROVIDED WITH A GEAR CHANGER

The present invention relates to chains for in particular cycles provided with gear changers.

More precisely, the invention concerns a chain composed of alternating links, respectively inner links and outer links, each inner link including a pair of parallel inner plates, and each outer link including a pair of outer plates which are parallel to each other and to the inner plates, the inner and outer links being articulated together about pins perpendicular to said plates.

These chains have been the subject of various adaptations for reducing the width thereof and facilitating the passage from one sprocket to the other upon each gear change.

However, a particular aspect of this gear change has apparently not been taken into account in the various known chains: in the course of an operation for changing from one ratio to another, upon actuation of the gear changer, the chain is laterally shifted by a chain guide roller and this guiding is achieved only by the cooperation between one or two inner links of the chain and a part of the periphery of the roller. The engagement of the inner link on the roller only occurs on a very short radial distance so that the lateral guiding of the chain is not very effective and the chain consequently has a tendency to become disengaged from the roller and to be offset from the median plane of the latter.

In practice, this imperfect guiding most often results in an actuation of the gear changer beyond the position which would correspond to the engagement of the chain on the chosen sprocket of the free wheel and then an actuation of it in the opposite direction for returning it to this position.

Attempts have also been made to improve the guiding of the chain by giving the roller relatively complex shapes, which has for consequence to increase the cost, and in any case this adaption has not enabled a very significant result to the obtained.

An object of the invention is therefore to provide a chain which, by its very configuration, permits achieving a very substantial improvement in the lateral guiding conditions when actuating the gear changer.

The invention therefore provides a chain of the aforementioned type comprising a side adapted to receive the teeth of the sprockets, and an opposite side adapted to cooperate with a chain guide roller, wherein the outer plates of said chain comprise in a central portion of their edge located on said opposite side, a projecting portion extending toward the interior of the chain, said projecting portions defining therebetween a gap of reduced width in which said chain guide roller can engage with a reduced lateral clearance.

According to other features of the invention:

in the known manner, the edge of each outer plate located on said opposite side of the chain is convex;

in the known manner, the edge of each outer plate located on the side of the chain receiving the teeth of the sprockets comprises a concave central portion and, moreover, said concave portion extends at least to the vicinity of a line joining the two articulation axes of the considered plate;

said projecting portion has a conical shape and is obtained by deformation of the edge portion of the outer plate.

The invention will be described hereinafter with reference to a particular embodiment. This description will be made with reference to the accompanying drawings which are given merely by way of example and in which:

FIG. 1 is an elevational view of the inner side of an outer plate according to the invention;

FIG. 2 is a plan view of this plate;

FIG. 3 is a sectional view taken on line 3—3 of FIG. 1;

FIG. 4 is a diagrammatic view representing the path of a chain which passes around a sprocket of a free wheel and around guiding and tightening rollers for the chain;

FIGS. 1 to 3 show an outer plate 10 according to the invention for use in a chain with which cycles provided with gear changers are provided.

Figure 5:
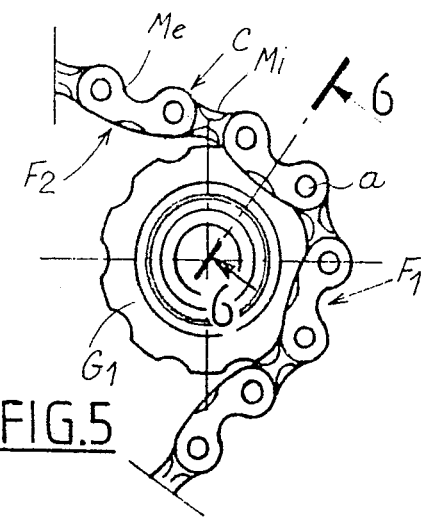
FIG. 5 is an elevational view of the passage of a chain according to the invention around a chain guide roller.

Said plate comprises two circular end portions 11 and a central portion 12. Provided in each end portion is an orifice 13 of circular shape for receiving an articulation pin between two identical links. The lower edge 14 of the plate (as viewed in FIG. 1) has in its central portion 14a a very pronounced concave shape and the bottom of this concave portion extends to the vicinity of, or even beyond, the line 15 joining the centres of the orifices 13. This lower edge of the plate is that which corresponds to the side of the chain facing the teeth of the sprockets with which this chain is adapted to cooperate. The inner edge of this concave portion may be chamfered in order to improve the chain-shifting operation. For the same purpose, this portion 14 may be outwardly laterally deformed.

The opposite edge 16, i.e. the upper edge when viewed in FIG. 1, has a convex shape and, in a central region of this upper edge, the plate is offset or deformed in such manner as to define a projecting portion 17 on a side which will be facing toward the interior of the chain.

In the illustrated embodiment, this projecting portion is constituted by a offset of part-conical shape.

The operation and the advantages of a chain comprising outer plates such as that shown in FIGS. 1 to 3 will be described with reference to FIGS. 4 to 8.

FIG. 4 shows the path of a chain C which extends around a sprocket P of a free wheel and around a chain guide roller G1 and a chain tightening roller G2. This chain is formed from inner links Mi and outer links Me which are articulated together about pins a (FIG. 5). It is clear from this diagram that the side F1 of the chain which receives the teeth of the sprockets is also that which is made to cooperate with the chain tightening roller G2. On the other hand, it is the opposite side F2 of the chain which extends around the chain guide roller G1.

Figure 6:
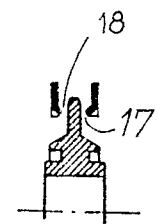
FIG. 6 is a partial sectional view taken on line 6—6 of FIG. 5.

This cooperation between the chain and the roller G1 is shown to an enlarged scale in FIGS. 5 and 6.

Owing to the presence of the projecting portions 17, it is clear that the gap 18 therebetween is of reduced width and the clearance between the edge of the outer plates and the sides of the roller is very substantially reduced (see FIG. 6). This effect is still further increased by the fact that this projecting portion is defined in an edge of the outer plate which is most convex or eccentric and is located closer to the axis of rotation of the roller. The interest of this is enhanced since, usually, the thickness of the roller increases in the direction toward the axis of rotation of the roller.

Figure 7:
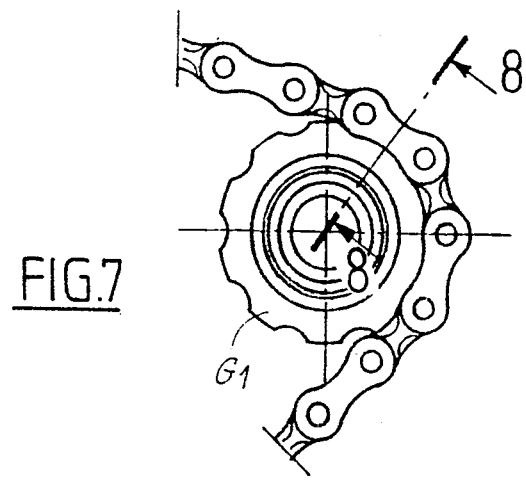
FIGS. 7 and 8 are views corresponding to FIGS. 5 and 6 in respect of a chain of the prior art.
Figure 8:
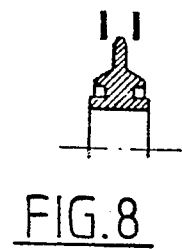

The comparison with the prior art can be made with reference to FIGS. 7 and 8. There can be very clearly seen in these two Figures that the central portion of the outer plates performs no function in the guiding of the chain by the roller and that this guiding is effected by the plates of the inner links only in a very small radial extent of the roller.

The fact of giving to the upper edge 16 of the outer plates a convex shape moreover permits the provision of a deeper recess on the opposite edge 14 of the plate while conserving in the central region of the plate a sufficient amount of material to permit the forces applied to the chain to be transmitted. Now, it is important that this concave portion (optionally internally chamfered or outwardly deformed) be capable of rising rather high up in the plate, since this facilitates the passage of the chain on a tooth, principally when passing from a given sprocket to a sprocket of larger diameter.

It must be understood that the invention may be applied to different types of chains, and in particular whatever be the shape given to the inner plates constituting the inner links and whatever be the construction of the articulation pins and the mode of articulation of the inner links on these pins.

What is claimed is:

1. A chain for combination with a gear changer system including sprockets and a chain guide roller for in particular a cycle, said chain comprising alternating inner links and outer links, each inner link comprising a pair of parallel inner plates, and each outer link comprising a pair of outer plates which laterally define a space therebetween and are parallel to each other and to said inner plates, articulation pins interconnecting said inner links and outer links and perpendicular to said plates, said chain having one side for receiving cogs of said sprockets and an opposite side for cooperation with said chain guide roller, said outer plates each including, in a central portion of an edge thereof located on said opposite side of said chain, a projecting portion extending toward the interior of the respective links, said projecting portions defining therebetween a gap of reduced width relative to the width of said space defined between said outer plates, in which gap said chain guide roller is engageable with a reduced lateral clearance between said chain guide roller and said outer plates.

2. A chain according to claim 1, wherein said edge of each outer plate located on said opposite side of the chain is convex.

3. A chain according to claim 2, wherein the edge of each outer plate located on said one side of the chain for receiving the cogs of said sprockets includes a concave central portion and said concave portion extends at least to the vicinity of a line joining the two articulation pins of the respective plate.

4. A chain according to claim 3, wherein said projecting portion is provided in the most convex portion of the edge of the outer plate.

5. A chain according to claim 4, wherein said projecting portion is a deformation of an edge portion of the outer plate.

6. A chain according to claim 4, wherein said projecting portion has a part-conical shape.

* * * * *